United States Patent [19]

Ezis et al.

[11] 4,401,617

[45] Aug. 30, 1983

[54] CERAMIC CUTTING TOOL FORMED FROM $SI_3N_4$-$Y_2O_3$-$SIO_2$ AND METHOD OF MAKING

[75] Inventors: Andre Ezis, Grosse Ile; Shyam K. Samanta, Ypsilanti; Krishnamoorthy Subramanian, Inkster, all of Mich.

[73] Assignee: Ford Motor Company, Dearborn, Mich.

[21] Appl. No.: 232,754

[22] Filed: Feb. 9, 1981

Related U.S. Application Data

[63] Continuation-in-part of Ser. No. 911,256, May 31, 1978, abandoned.

[30] Foreign Application Priority Data

Apr. 5, 1979 [JP] Japan ............................. 54-40425
Apr. 25, 1979 [CA] Canada ............................. 326356
May 30, 1979 [AU] Australia ............................. 45597

[51] Int. Cl.³ ............................................. C04B 35/58
[52] U.S. Cl. ............................................. 264/332; 501/87
[58] Field of Search .................. 106/73.2; 264/332

[56] References Cited

U.S. PATENT DOCUMENTS 3,830,652  8/1974  Gazza ............................ 106/73.2

OTHER PUBLICATIONS

Smith, "Temperature and Compositional Stability of a $Y_6Si_6O_{21}$ Phase in Oxidized $Si_3N_4$", Oct. 1977, pp. 465-466.

Primary Examiner—John A. Parrish
Attorney, Agent, or Firm—Joseph W. Malleck; Olin B. Johnson

[57] ABSTRACT

A method is disclosed comprising placing in a hot pressing environment a controlled mixture of a first powder of $Si_3N_4$ containing a controlled amount of $SiO_2$ (with or without a limited amount of milling media) with a second powder consisting essentially of $Y_2O_3$, hot pressing the controlled mixture, and cooling the resultant unitary object.

A novel silicon nitride comprising a unitary object is disclosed which can be shaped to form a novel cutting tool useful for machining metal such as cast iron. The object has selected crystalline phases formed beta $Si_3N_4$ and beta prime $Si_3N_4$ and as intergranular crystalline secondary phases consisting essentially of $YSiO_2N$, $Y_{10}Si_{17}N_4O_{23}$ and $Y_2Si_2O_7$ with the $YSiO_2N$ phase representing at least a 25% volume fraction of the secondary phases and comprising essentially all of the yttria-silicon oxide.

5 Claims, 7 Drawing Figures

CERAMIC CUTTING TOOL FORMED FROM SI₃N₄-Y₂O₃-SIO₂ AND METHOD OF MAKING

RELATED APPLICATIONS

This application is a continuation-in-part of U.S. Ser. No. 911,256, filed May 31, 1978, now abandoned, by the same inventors as the present application.

BACKGROUND OF THE INVENTION

Recently, ceramics composed principally of silicon nitride have found significant use as ceramic components for engine components or as vessel coatings. This material is known to have many good characteristics, such as high oxidation resistance at high temperatures (1400° C.), good mechanical strength at high temperatures (1400° C.), and good hardness at high temperatures.

Strength of this material is related to density and it has been found that the densification property of silicon nitride sintered under atmospheric pressure is very inferior. Therefore, it has been considered important to employ high pressure when a product of good strength is desired. This is routinely referred to as hot pressing of silicon nitride. However, in spite of the use of hot pressing, the bend strength of simple silicon nitride has not been as high as desired at high temperatures. Accordingly, other avenues of strength improvement have been sought, such as through the use of additives which operate as a low temperature liquid phase of facilitate densification. Although the Si₃N₄ material became more dense, its resistance to thermal cracking and creep at high temperatures was lowered. A glassy phase in most instances was formed in the grain boundaries of the Si₃N₄ matrix. The room temperature strength was increased, but at the expense of other physical properties of which the ceramicist was unaware.

These added materials have included relatively large amounts of chromium oxide, zinc oxide, nickel oxide, titanium oxide, cerium oxide, magnesium oxide, yttrium oxide and others, ranging in excess of 20% by weight of the matrix material. With these particular additives, the Si₃N₄ tends to form a structure having a strength level which does not usually exceed 50 ksi at high temperatures. In one instance (U.S Pat. No. 3,830,652 to Gazza) did the prior art obtain strength levels in excess of 50 ksi. In this instance, the concern was for physical characteristics useful for turbine elements: hardness, oxidation resistance (inertness) and transverse rupture strength. Gazza explored metal oxide additives to a Si₃N₄ system which ranged in amounts related solely to machine element usage. The grain boundary phase was identified by Gazza as glassy in a companion article which appeared in the Journal of the American Ceramic Society, Vol. 56, No. 12, p. 662 (1973).

Commercial cutting tools today exhibit the same or better physical properties that were the focus of Gazza's work. For example, commercial Al₂O₃ or TiC tools have excellent hardness at high temperatures, have high resistance to oxidation, and have transverse rupture strengths at high temperatures which range up to 100,000 psi. Tool designers, rightly or wrongly, have considered strength the most important feature because of the necessity to withstand the forces imposed on the tool material by the tool fixture and by the resistance of the stock material, particularly at heavy depths of cutting. These forces become unusually exaggerated when cutting ferrous material such as cast iron at high speeds and feeds. Without increased strength, it is believed by those skilled in the art that further improvements in tool life cannot be achieved. Since the strength level of Si₃N₄ is equal to or lower than commercial materials now available, it has been rejected as a tool material candidate with little hope of improving tool life.

In only one known prior instance has the art attempted to employ Si₃N₄ directly as a cutting tool material, and this was for use only on hypereuteric aluminum alloys. This attempt is set forth in Japanese Pat. No. 49-113803 to Ohgo (10/30/74), appearing in Chemical Abstracts, Vol. 84, p. 286 (1976). In this work, silicon nitride was sintered (as opposed to hot pressing) and metal oxide spinels were employed in solid solution in the silicon nitride matrix. The spinels were formed by a mixture of divalent and trivalent metal oxides (including magnesium oxide and Y₂O₃). However, the molar percentage of the spinel metal oxide in the material was taught to be 10–40%. The author experienced difficulty in obtaining good sintering density when the molar percentage fell below 10. The highest density achieved was 3.18 g/cm³. A two-step method was used by this Japanese author requiring first a heating of the metal oxide powders to 1300°–1600° C. for 3-10 hours to form the spinel. The spinel was pulverized and mixed with a silicon nitride powder which, in turn, was sintered to form cutting tools. Only a quarternary system was employed involving Si₃N₄, SiO₂, MgO and Y₂O₃. This produced many secondary phases which weakened the physical characteristics, particularly strength, thermal conductivity, and increased the thermal coefficient of expansion. A loss of these physical characteristics would make it most difficult to obtain even equivalent performance to commercially available tools when applied to a rigorous cutting environment such as interrupted cutting on cast iron. The cutting operation of the Japanese patent was of very short duration (two minutes) of continuous machining, and at low metal removal rates (cutting speeds of 1000 sfm, 0.012 inches per rev. of feed, 0.060 inches of depth of cut, and metal removal of 8.64 in³/min).

This type of test information, of course, did not investigate cutting applications where large forces are applied to the tool, did not investigate the elimination of spinel additives, did not investigate heavy cutting against rough surfaces such as cast iron, nor continuous cutting for periods of several hours or greater, not did it explore intermittent, interrupted high speed cutting at speeds of 4000–5000 sfm at heavy feeds and depths of cutting. The demonstrated wear of 0.006–0.008 inches (in Ohgo's work) for two minutes of cutting time is highly excessive when compared to the goals of the present invention. Therefore, this work did not demonstrate that Si₃N₄ possessed sufficient characteristics to be used as a tool material on ferrous materials which apply large bend forces to the tool.

Moreover, the art has been possessed of sufficient knowledge in the making of Si₃N₄ with additives for many years. During this long term, no effort was made to apply this material as a cutting tool against cast iron. This tends to support the contention of this invention that if tool life is dramatically increased for certain Si₃N₄ composites when used for machining cast iron, there must be some unobvious characteristics independent of strength that layed undiscovered to promote this new use.

SUMMARY OF THE INVENTION

This invention relates to a novel silicon nitride comprising unitary object that can be shaped to form a novel cutting tool useful for machining metal such as cast iron and to a novel method of making a unitary silicon nitride comprising object.

The novel method of this invention comprises placing in a hot pressing environment a controlled mixture of a first powder of $Si_3N_4$ containing a controlled amount of $SiO_2$ (with or without a limited amount of milling media) with a second power consisting essentially of $Y_2O_3$, hot pressing the controlled mixture, and cooling the resultant unitary object.

More particularly, this novel process comprises (a) placing in a hot pressing environment a controlled powder mixture consisting essentially of $Si_3N_4$, $Y_2O_3$ and $SiO_2$ wherein the $Y_2O_3$ comprises about 4 to about 12% by weight of the controlled powder mixture and the $Y_2O_3/SiO_2$ weight ratio therein is at least about 1.6, the controlled powder mixture being further characterized as a mixture of a first powder and a second powder, the first powder consisting essentially of substantially alpha phase $Si_3N_4$ and $SiO_2$, and containing less than about 1.0% by weight cation impurities excluding free silicon, the second powder consisting essentially of $Y_2O_3$, (b) hot pressing the controlled mixture at a temperature and pressure and for a time sufficient to compact and react the controlled powder mixture into a unitary silicon nitride comprising object having a density of at least about 3.25 g/cm$^3$, and (c) cooling the resultant unitary object.

In one embodiment of this method, the controlled mixture contains up to about 0.5-1.5% by weight oxygen combined as $SiO_2$.

In one embodiment of this method, the silicon nitride comprising first powder has an oxygen content limited to about 0.7% by weight oxygen combined as $SiO_2$.

In one preferred embodiment of this invention, the concentration of $Y_2O_3$ in the controlled powder mixture is between about 7 and about 9% by weight.

It is one object of this invention to provide a method of making a fused $Si_3N_4$ ceramic having selected crystalline phases formed from beta $Si_3N_4$ and beta prime $Si_3N_4$ and has intergranular crystalline secondary phases consisting essentially of $YSiO_2N$, $Y_{10}Si_{17}N_4O_{23}$ and $Y_2Si_2O_7$ with the $YSiO_2N$ phase representing at least a 25% volume fraction of the secondary phases and comprising essentially all of the yttria-silicon oxide (as distinguished from yttria-silicon-oxynitrides) present.

In a preferred embodiment of this invention, the following limitations are observed (a) $SiO_2$ is present as a surface oxide on the $Si_3N_4$ powder in an amount such that the oxygen component thereof comprises 0.5 to 1.5% by weight of the $Si_3N_4$ powder, (b) $Y_2O_3$ powder is added in an amount such as to constitute about 7 to about 9% by weight of the resultant mixture.

Preferably, the $Si_3N_4$ powder contains less than 1% by weight, more preferably less than 0.5% by weight cation impurities exclusive of free silicon.

The components of the controlled powder mixture may in and of themselves serve as nucleating agents for forming crystalline secondary phases but milling media and the cation impurities also have an effect, in some cases, e.g. $Al_2O_3$, a more pronounced effect on nucleation. The milling media is preferably selected from $Al_2O_3$, WC or TiC. $Al_2O_3$ is the most preferred because of its pronounced effect as a nucleating agent.

Preferably, the $Y_2O_3/SiO_2$ weight ratio is at least 2.5.

Particle size in the controlled mixture may be reduced prior to or after mixing and advantageously ranges from an average particle size of about 1 to about 2.5 microns, more preferably about 1 to about 1.7 microns.

The highest pressure employed in the hot pressing process is at least about 3000 psi, preferably at least 5000 psi.

The highest temperature employed in the hot pressing process is at least 1650° C., preferably at least 1750° C.

It is desirable if a pressure of at least 2000 psi (preferably about 4500 psi) is continuously applied prior to achieving the hot pressing temperature prior (or at least during the time the controlled powder mixture is experiencing the 1000°-1400° C. range) with the mixture containing a nucleating agent such as $Al_2O_3$. The pressure is increased to at least 3500 psi (if not already at this level) and maintained continuously during hot pressing at 1680°-1750° C. (desirably for at least 5 minutes but up to 3-8 hours). Such ceramic product will exhibit a thermal shock parameter at 1200° C. of at least $$110 \times 10^9 \frac{\text{BTU-lbs}}{\text{Hr. (in}^3)},$$

a hardness level of at least 87 Rockwell 45-N, a density of at least 3.25 g/cm$^3$, and a transverse rupture strength of at least 70,000 psi at 1200° C. Such ceramic product can be used as a cutting tool material which will continuously or interruptedly machine cut cast iron stock for at least 10 minutes at speeds of 50-7500 sfm, at a depth of cut of about 0.1 inch or greater, without failure by thermal cracking or wear.

DESCRIPTION OF THE DRAWINGS

FIG. 4 depicts the front face side and FIG. 5 depicts the rear spindle side.

DETAILED DESCRIPTION

Figure 1:
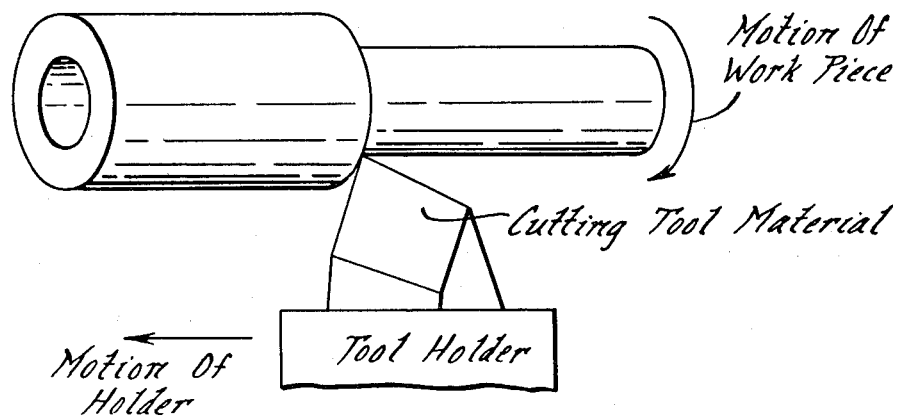
FIG. 1 is a perspective view of the work stock employed in a first set of laboratory cutting operations requiring continuous cutting simulation.

The tendency toward higher speeds and feeds to achieve lower production costs and higher productivity imposes an ever increasing demand for greater wear life on cutting tools. The temperature rise at the tool tips at these speeds and feeds is very high. Tool materials have to be inert at such working temperatures and their dynamic properties have to be superior to those of existing tool materials.

In accordance with this invention, it has been discovered that $Si_3N_4$, when combined with critically controlled amounts of certain oxides in a narrow volume fraction range then hot pressed under controlled temperature, pressure and time conditions, will produce a cutting tool composition for a simple ternary system ($Si_3N_4 \cdot SiO_2 \cdot Y_2O_3$) that can be utilized at high speeds and heavy feeds on cast iron, exhibit high wear resistance, and will fail by a mode of gradual wear, rather than thermal fatigue or catastrophic failure.

The cutting tool formulation meets the needs of a specific set of cutting conditions created by working on cast iron. The tip temperature of the tool will experience a temperature typically in the range of 600°–800° C. and as high as 1000° C. This temperature factor is important since it is high enough to create thermal shock sites in portions of the tool, but not high enough to create a serious oxidation erosion problem. When machining cast iron, the chip easily fragments, keeping any hot chip normally away from the tool tip.

Due to the resistance of cast iron to cutting, large fixture forces must be applied to the tool to move it through the stock material. Moreover, the mass removal rates required in many cutting operations on cast iron is considerably greater than used with other stock materials. This necessitates a strong tool material with respect to transverse rupture strength. Tool designers heretofore consider this latter aspect the most important consideration with respect to evaluating the success of a new tool material.

The three virtues normally recognized of $Si_3N_4$ would not suggest to one skilled in the art that it would be a successful candidate for maching cast iron. Its transverse rupture strength at high temperatures rarely exceeded 50,000 psi (while commercial tools regularly experienced strength levels of 100,000–200,000 psi, its high oxidation resistance was not critically needed, and its good hardness at high temperatures was easily exceeded by the hardness of commercially available silicon carbide tools.

The present invention recognized for the first time the role played by thermal shock resistance factors, namely, the coefficient of thermal expansion ($\alpha$) and thermal conductivity (K) related to the modulus of rupture (S). This is defined herein by the expression ($KS/\alpha E$), where E is Young's modulus and can be eliminated because it remains substantially constant under varying cutting conditions and material variations. By maintaining this thermal shock parameter above $$110 \times 10^9 \frac{BTU \cdot lbs}{Hr. (in^3)},$$

it has been determined that a significant increase in wear life can be achieved on cast iron. It is difficult to theorize why this phenomenon takes place, but it may be due to the greater structural stability that is achieved by the ceramic at 700° C. Generated heat is quickly conducted away, preventing a large temperature gradient in the tool which leads to cracking if the material has an undesirable coefficient of thermal expansion; this may more readily be experienced when the tool tip is slightly cooled by intermittent or interrupted cutting.

A preferred method for carrying out the invention of making a unitary silicon nitride comprising object useful as a cutting tool for metals, such as cast iron, is as follows.

(1) A controlled powder mixture is placed in a hot pressing environment. The mixture consists essentially of alpha phase silicon nitride powder (preferably at least 85% alpha phase) carrying up to about 0.7% $O_2$ (by weight of the $Si_3N_4$ powder) preferably 0.5–1.5% oxygen (combined as $SiO_2$ on the surface of the silicon nitride particles) and a sintering aid consisting of about 4% to about 12% $Y_2O_3$ by weight of the mixture (preferably 7–9%). 0.75–2.5% alumina is present as a milling media impurity and is added by ball milling attrition. The amount of $Y_2O_3$ is adjusted to render a $Y_2O_3/SiO_2$ ratio of at least 1.6 and preferably an increased ratio of at least 2.5–2.7. $SiO_2$ is accordingly limited so that the oxygen content thereof is in the range of about 0.5 to about 1.5% by weight of the controlled mixture.

The content of $SiO_2$ on the silicon nitride powder may be indirectly determined by atomic activation analysis. The major cationic impurities in the silicon nitride powder are preferably controlled in the following manner: less than 0.5% iron, less than 0.01% calcium, and less than 0.4% aluminum. It is advantageous if the total cation impurities are limited to 1% or less of the $Si_3N_4$ powder and preferably 0.5% or less, excluding free silicon (Si, $O_2$ and $SiO_2$).

To achieve the $Y_2O_3/SiO_2$ ratio limit, the $O_2$ of the $Si_3N_4$ powder must be controlled. The $O_2$ content (and therefore the $SiO_2$ content) of the $Si_3N_4$ is preferably controlled by certain steps taken during preparation of the $Si_3N_4$ powder. The $Si_3N_4$ powder is produced by nitriding silicon metal powder in a furnace having a construction which places a water cooled metal cannister about a hot shield to protect the cannister. Extraneous insulation and entrapment materials in the hot zone are eliminated. The vacuum pumping system in communication with the hot zone is capable of reducing the $O_2$ and $H_2O$ content of the atmosphere in the hot zone to less than five ppm, additional $O_2$ or $H_2O$ being incapable of being drawn from the water cooled cannister. The metal powder, after being nitrided in such hot zone in an essentially nitrogen gas environment having a precisely controlled purity, will typically possess an $O_2$ content of up to about 0.7% of the weight of the powder and preferably less than 1.0% $O_2$ and an $SiO_2$ surface content of 2.0% or less. The powder may pick up some oxide as a result of handling subsequent to nitridation and thus the with up to a maximum of about 3.0% $SiO_2$.

The average particle size for the silicon nitride powder is preferably controlled or selected to be 2.0–2.5 microns. The particle size is preferably determined by the x-ray sedimentation method. With respect to the yttria powder, such powder is preferably controlled to have a chemistry of 99.9% pure and its particle size is preferably controlled to less than −325 mesh.

It is preferred that the mixture be milled in a ball milling device so that the final average particle size of the mixture will be in the range of 1.0–2.5, preferably 1.0–1.7 microns. To this end, the powder ingredients are placed in a milling device along with the introduction of $Al_2O_3$ milling media. The alumina serves as a catalyzer for a nucleating reaction to be described. It is typical to employ a wetting lubricant such as methanol which may be added in the ratio of 1:1 with the silicon nitride powder. The powder mixture is sufficiently ground and milled for a predetermined time which depends on mill speed, particle size of the starting powders, and the average particle size to be achieved. The mixture is then preferably dried and subjected to a screening operation preferably using a 100 mesh screen. The milled mixture should contain 0.50–2.5% of the alumina milling media.

(2) The mixture is then heated to 1000°–1400° C. under a pressure of at least 2000 psi and for a period of time sufficient to permit a nucleating reaction to take place in secondary phases formed as a result of heating. During heat up of the powder mixture, mechanical pressure is applied initially at room temperature and maintained throughout heat up so that when the powder mixture passes through the temperature zone of 1000°–1400° C., the powder mixture is under a pressure of 2000–5000 psi (advantageously about 4500 psi) when AlO$_3$ is employed. Preferably, in carrying this out, the mixture is placed in a graphite die assembly for applying pressure. The assembly is air blown to a clean condition and coated with a boron nitride slurry and dried to a coating thickness of about 0.002 inches prior to the insertion of the powder mixture. It is preferred that the powder mixture, after having been inserted into the coated graphite dies, be precompacted under a pressure of about 500 psi prior to the introduction of any heat and prior to elevation to pressing pressures in excess of 2000 psi. When the pressure dial indicator stabilizes at 500 psi, the mechanical loading is advantageously increased to 4500 psi at approximately the rate of 1000 psi per minute. When this latter pressure condition is reached, heat is administered by induction heating which heats up a graphite die chamber in the assembly at a rate which is preferably no less than 100° C. per minute. The time period or excursion in the temperature zone of 1000°–1400° C. can be as little as one minute and as long as desired, but advantageously is 5–15 minutes.

Pressure and time are interrelated variables that together are adjusted under given conditions to achieve a nucleating reaction in the compounds or secondary phases formed between Si$_3$N$_4$, SiO$_2$ and Y$_2$O$_3$. The higher the bulk density of the powder, the lower the applied pressure can be within a given range. The presence of Al$_2$O$_3$ promotes or catalyzes the formation of nucleii as part of this reaction and thus influences time. The nucleating reaction is necessary to the in situ crystallization of the secondary phases.

As indicated, it has been found that the addition of 0.75–2.5% Al$_2$O$_3$ catalyzes the nucleating reaction. Other milling media that will also operate effectively as nucleating agents are WC, TiC and Si$_3$N$_4$, and should be present in an amount of 0.5–2.5% of the mixture. Al$_2$O$_3$ is advantageously added by adapting the milling media to consist of alumina, except for up to 10% SiO$_2$. Thus, during the ball milling operation, there is a transfer during each particle impact with the milling media of a small portion of alumina. These particle transfers build up over a predetermined period of time so that the powder mixture will uniformly contain a desired alumina content. The milling media time, to achieve this specific transfer of alumina not exceeding 2.5%, is determined by experimental experience. Such experience has shown that there will be a corresponding milling media wear in the range of 0.75–2.5 weight percent.

(3) After the nucleating reaction has taken place, heat up of the mixture is continued to the temperature of about 1650°–1750° C. (preferably at least a maximum of 1700° C.) under a pressure and for a period of time sufficient to produce 99%, preferably 99.5% or more, of full theoretical density in the pressed mixture. This step achieves hot press sintering. It is preferred that the applied pressure be 3500–5000 psi (the preferred maximum is at least 5000 psi) for at least the period necessary to achieve full density which may be as little as five minutes or as long as 3–8 hours. The heating period should be economically justified and thus advantageously should be about 15–45 minutes.

The product resulting from the above method can be cooled at any rate, even quenched, to form a silicon nitride comprising object which has a primary matrix phase of silicon nitride and crystallized secondary phases in the grain boundary of the matrix.

With the prescribed powder chemistry and hot pressing technique, the resulting product will possess a density of at least 3.25 g/cm$^3$, preferably in the range of 3.29–3.5 g/cm$^3$, a hardness on the Rockwell 45-N scale of at least 87, preferably in the range of 89–91.0, and a thermal shock parameter at 1200° C. of at least $$110 \times 10^9 \frac{\text{BTU-lbs}}{\text{Hr. (in}^3)}$$

In addition, the material will exhibit a transverse rupture strength of at least 70,000 psi at 1200° C., a thermal conductivity of at least 3.2 BTU/Hr.-in.-°F. at 1200° C. and a coefficient of thermal expansion no greater than $1.87 \times 10^{-6}$ in/in. °F. at 1200° C., and a modulus of elasticity no greater than $53 \times 10^6$ psi.

The secondary phase constituent will consist of one or more of three crystallized forms in the final product. Such forms of secondary phase comprise the group consisting of 5Y$_2$O$_3$.4SiO$_2$.Si$_3$N$_4$ (which is Y$_{10}$Si$_7$O$_2$N$_4$); 2Y$_2$O$_3$.SiO$_2$.Si$_3$N$_4$ (which is Y$_1$Si$_1$O$_2$N$_1$); and Y$_2$O$_3$.2SiO$_2$ (which is Y$_2$Si$_2$O$_7$). There is an absence of the N-melilite phase (Si$_3$N$_4$.Y$_2$O$_3$) which oxidizes very readily, and the absence of Si$_2$N$_2$O which deteriorates the thermal shock parameter and wear resistance. The absence of these phases is controlled by the regulation of the Y$_2$O$_3$/SiO$_2$ to at least 1.6% and preferably at least 2.5–2.7%.

Two of the secondary phases provided in the resulting product of this invention are yttrium silicon oxynitrides and the other is a yttrium silicon oxide. The yttrium silicon oxide (Y$_2$Si$_2$O$_7$) will be the only oxide present in the material if the Y$_2$O$_3$/SiO$_2$ ratio of at least 2.5 is observed and substantially only Y$_2$Si$_2$O$_7$ when the Y$_2$O$_3$/SiO$_2$ ratio exceeds 1.6. The molecular formulas for each of the two oxynitrides are Y$_{10}$Si$_7$O$_2$N$_4$ and Y$_1$Si$_1$O$_2$N$_1$. These oxynitrides will in most cases occupy approximately 80% volume fraction of the secondary phase present in the resulting product and the yttrium silicon oxide will in most cases occupy the remaining 20% of the product secondary phase (preferably less than 30% volume fraction). The YSiO$_2$N phase preferably represents at least a 25% volume fraction of the secondary phases, this again being obtained by controlling the Y$_2$O$_3$/SiO$_2$ ratio to at least 1.6%.

The silicon nitride in the final product will be of the beta type, the conversion from alpha to beta occurring typically before full density is achieved. In the case where aluminum oxide is used as an intended milling media additive in the range of up to 2.5%, the final product will have beta silicon nitride containing aluminum atoms. The material can then be shaped as a desired cutting tool.

EXAMPLE I

Figure 2:
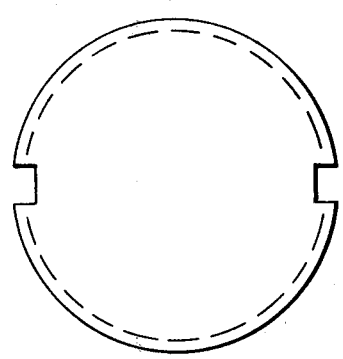
FIG. 2 is an end view of a work stock similar to FIG. 1 illustrating the mode to simulate interrupted cutting.

A sample cutting tool material (identified as Sample 1) was prepared employing hot pressed silicon nitride with 7.47 weight percent Y$_2$O$_3$ (this is labeled as an 8% Y$_2$O$_3$ addition to a powder having 85% alpha phase Si$_3$N$_4$). The Si$_3$N$_4$ contained about 4.6% SiO$_2$, providing a $Y_2O_3/SiO_2$ ratio of about 1.6%. Cation impurities were maintained below one percent, with about one percent WC milling media impurity. The powder mixture was hot pressed at a temperature of 1740° C. under 6500 psi ($9.55 \times 10^6$ kg/cm²) for a period of 2 to 6½ hours. The pieces of hot pressed material were ground to a tool geometry of SNG 434 and the edges were prepared with 0.006"×30° K. land (chamfer). Each of the cutting tools prepared from this material were subjected to a cutting sequence on a simple cylindrical cast iron casting which varied between continuous, intermittent or interrupted. As shown in FIG. 1, the continuous cutting consisted of generating cylindrical surface 10 at a prescribed speed, feed and depth of cut. Due to the expanded length of the cylinder 11, the tool tip experiences a relatively constant high temperature for the duration of the pass. Intermittent cutting consisted of withdrawing the tool intermittently along a longitudinal pass. Interrupted cutting consisted of passing the tool circumferentially about the cylinder along a path 12, as shown in FIG. 2, which path encounters the previously cut longitudinal grooves. The latter provides repeated impacts for the tool.

Each type of cutting style imposes a different thermal condition on the tool which affects tool life in different ways. Other tool materials samples were similarly prepared with different chemistries, as shown in Table I, along with their resultant physical properties. Samples 6 and 7 are of prior art compositions.

The cutting operation for all these samples was carried out in a laboratory environment at a variety of speeds and varying feed rates at a constant depth of cut; the tool geometry was varied only in the corner configuration as indicated. The wear in inches was measured for specific periods of time. The results of such cutting are shown in Table II. None of the tools were used to full life; the cutting time was terminated when a significant increase in tool life was perceived. Five minutes, under high cutting speeds (3000–4000 sfm), was deemed an unusually high increase in life when compared to commercial tools which typically fail after one minute.

The results from the tests in Example I demonstrate that employing 8-12% $Y_2O_3$ with a $Y_2O_3/SiO_2$ ratio of 1.6 provides a significant increase in tool life when machining cast iron. It is believed that an increase in the thermal shock parameter of $Si_3N_4$ under extreme temperature conditions has led to this increase in tool life. The attainment of select crystalline secondary phases from a starting system of $Si_3N_4.SiO_2.Y_2O_3$ makes possible such increase in thermal shock parameters. The ability to have a stable structure at 600°-800° C. while under severe stress, along with the ability to effectively conduct away heat preventing a loss in high temperature strength, provides the basis for this life improvement. These physical characteristics are critically affected by the compositional phase of the $Si_3N_4$ composite. This example demonstrates that the material produced by the disclosed method will have wear life characterized by measured wear of no greater than 0.010" after one hour of continuous cutting of cast iron at a mass removal rate of at least 25 in³/min. or mechanical failure under cutting conditions prescribed by at least 2000 ft/min. with a depth of cut of at least 0.06 inches and a rate of feed of at least 0.012 inches per IPR.

EXAMPLE II

Figure 3:
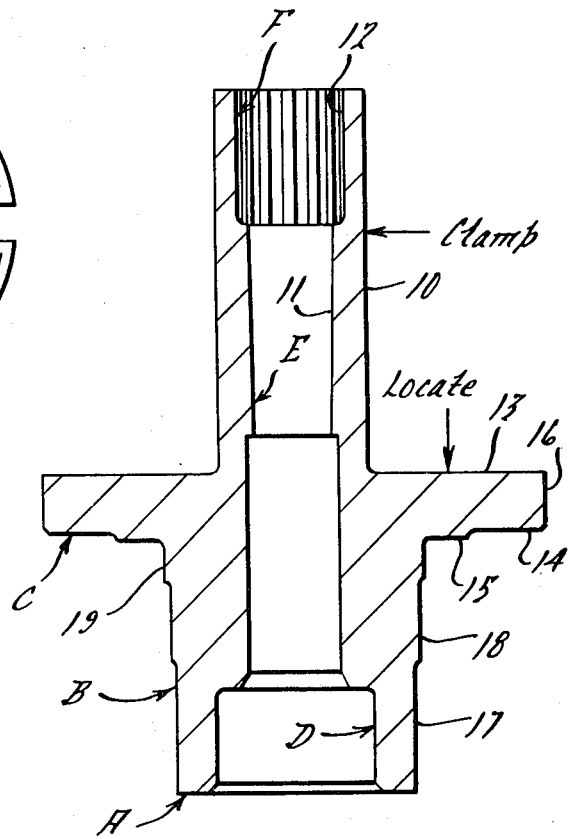
FIG. 3 is a central sectional view of a stator support casting used as the stock material for production machining examples.
Figure 4:
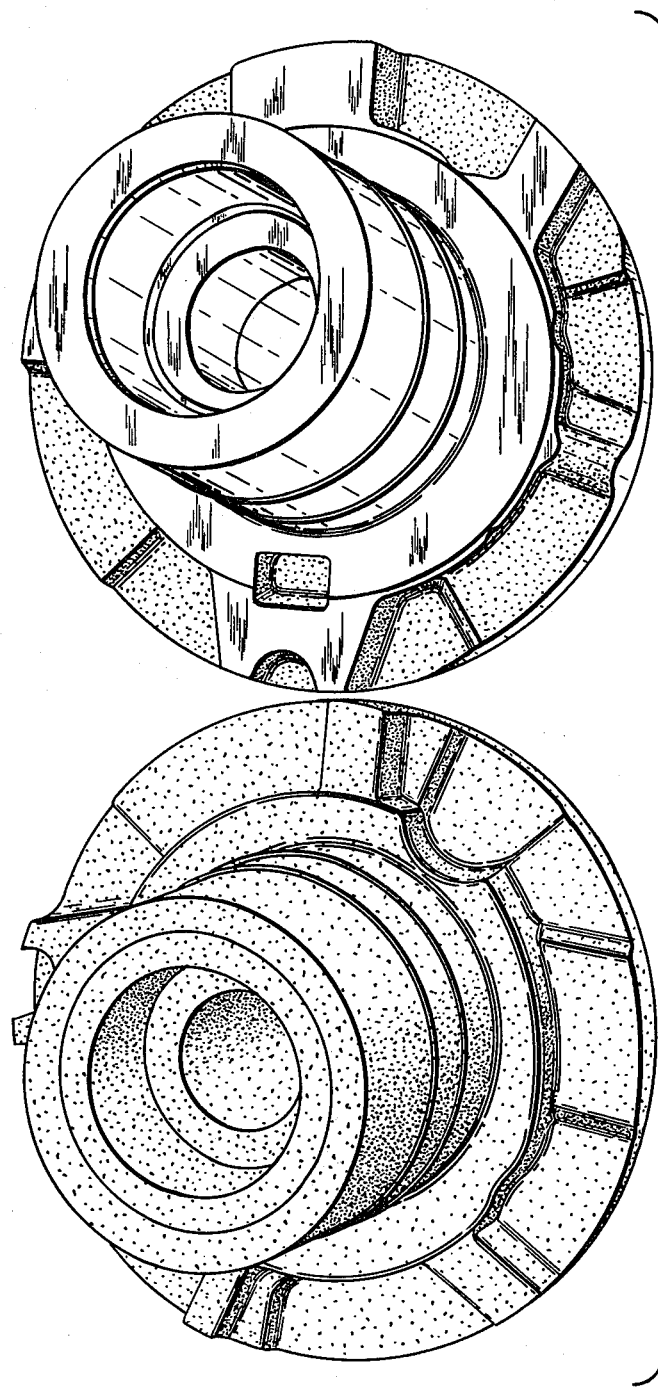
FIGS. 4 and 5 are before machining and after machining photographs of the actual casting of FIG. 3.
Figure 5:
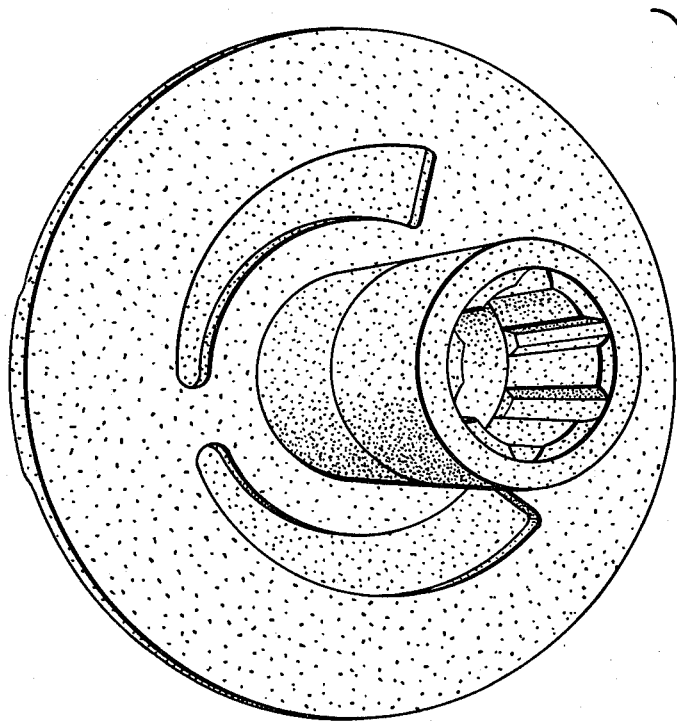
Figure 5:
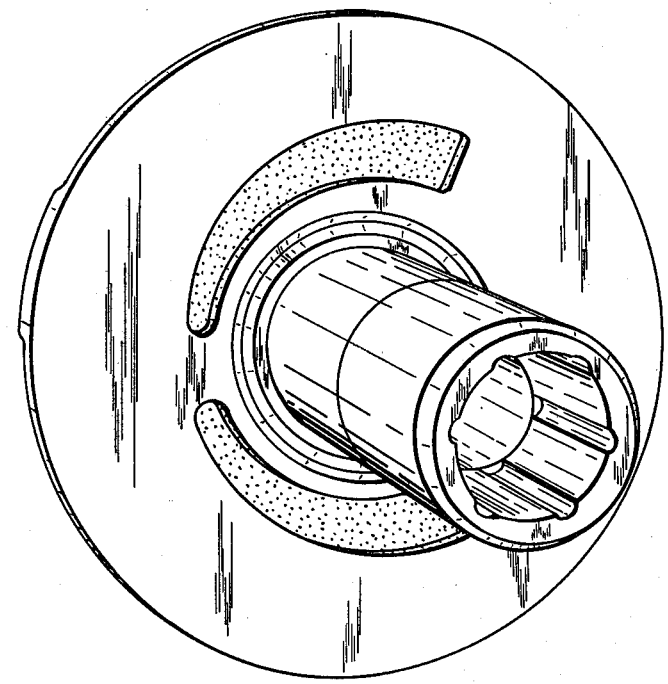

Substantially the same cutting tool materials, prepared as indicated from Example I, were prepared for cutting use in a production environment with actual production machines at Ford Motor Company's machining plants. The casting to be machined was a difficult production vehicle casting (stator support) in some cases, and an engine block in others; the stator support is shown in FIGS. 3, 4 and 5. For the stator support, continuous cutting was experienced at surfaces B and D, intermittent cutting at surface A, and interrupted cutting at surfaces C and F (see FIG. 4).

These sample materials were run under a variety of cutting conditions as set forth in Table III. All tool materials were run to failure, which is measured by the number of pieces produced up to that failure event. Failure herein is defined (as regularly accepted in the industry) to mean loss of workpiece tolerance or failure by fracture or chipping.

From the data in Tables III, IV and V, it can be concluded that controlled processing of $Si_3N_4$ with $Y_2O_3$, with a relatively high or increased $Y_2O_3/SiO_2$ ratio, provides the kind of thermal shock parameter that leads to longer tool life when machining cast iron at large mass removal rates or high speed. Table III proceeds from lower cutting speeds to higher speeds with comparative materials grouped adjacent each other. For each comparison, the inventive samples render significant increases in tool life by a greater number of workpieces produced. The inventive materials preform three to eight times better than current commercial tools. In finish machining of the front end of an engine block (Table III), the number of blocks milled were 2100 pieces per corner, with a depth of cut of 0.065 inch. Whereas, using commercially available ceramics with half of that feed rate, the number is 600 pieces. The inventive material will provide (a) increased production at current cutting conditions, (b) increased production capacity at higher cutting speeds and feeds, (c) savings in tool material cost, (d) reduction in tool change downtime, and (e) increased production capacity leading to free machine time for preventive maintenance.

To obtain at least a four-fold increase in tool life over commercially available tool materials, the $Si_3N_4.SiO_2.Y_2O_3$ ternary system must be employed, with $Y_2O_3$ controlled to a limit of 7-9% (see Table IV), and the $Y_2O_3/SiO_2$ ratio must exceed 1.60.

Figure 6:
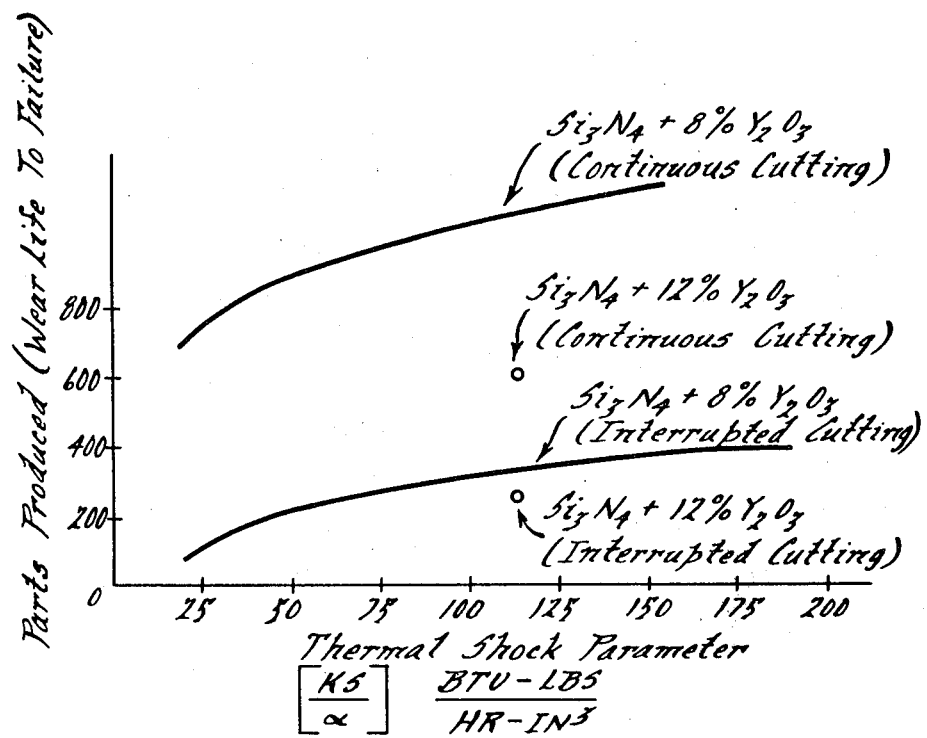
FIG. 6 is a graphical illustration of wear life to failure versus thermal shock parameter employing the invention.
Figure 7:
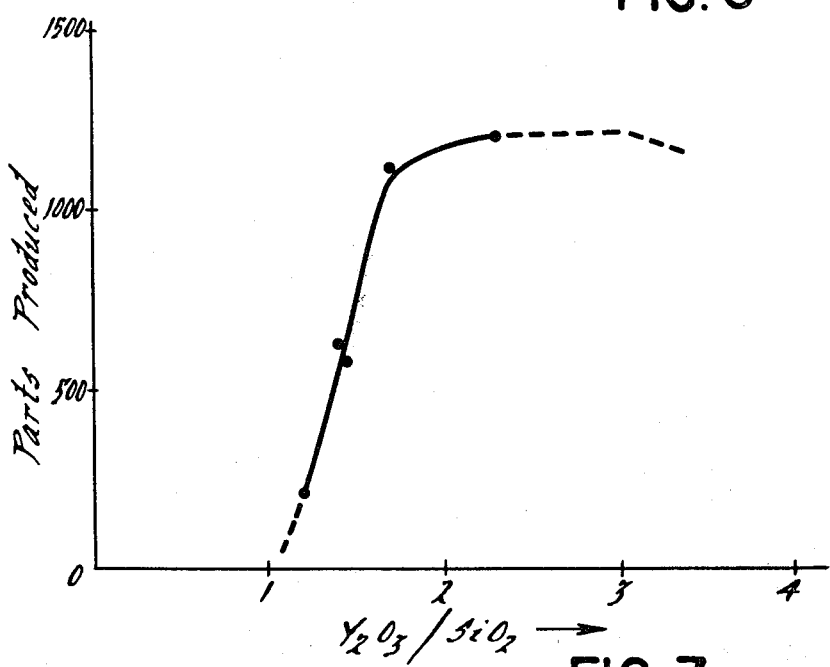
FIG. 7 is a graphical illustration of wear life to failure versus $Y_2O_3/SiO_2$ ratio.

The influence of the $Y_2O_3/SiO_2$ ratio is portrayed in FIG. 7 and also in Table V. The data shown for the two samples at the bottom of Table V are of significant note. Sample 17 represents a material produced in accordance with the preferred method mode, but employing four percent $Y_2O_3$ and an oxygen content in the $Si_3N_4$ powder of 0.8%. Sample 18 represents a material prepared in accordance with the teachings of U.S. Pat. No. 3,830,652 (Gazza) which discloses use of a maximum of about four percent $Y_2O_3$ in a $Si_3N_4$ matrix with no control of $SiO_2$ as an impurity on the $Si_3N_4$ powder grains except that inherent in the way $Si_3N_4$ was produced by conventional nitriding furnaces of the time. The principal variable between the two samples was the $Y_2O_3/SiO_2$ ratio. Each sample material was given a tool geometry of TNG 434 and subjected to the cutting of gray cast iron under the conditions listed. Each was used to cut the same number of identical parts up to 360. Wear on each tool was measured. The average wear for the material resulting from the invention herein was 25% less, the maximum wear was 20% less, and the flake depth was 70-50% less (flake depth is used herein to mean decrease in flank width through rake face flaking). This is a significant reduction in wear for such a short usage. Phase analysis of the two samples showed Sample 18 contained a secondary phase $Si_2N_2O$ which was not present in Sample 17 and which phase typically does not appear in materials having a $Y_2O_3/SiO_2$ ratio of at least about 1.6. In this manner, the thermal shock parameters can be optimized at either continuous or interrupted cutting conditions. FIG. 6 and Table IV portray the role played by the thermal shock parameter.

TABLE I

| Material Sample | S, Transverse Rupture Strength (4-Point Bending), KSI | | Hardness Room Temp. Rockwell 45-N | Density gm/cm³ | $\alpha$, Coefficient of Thermal Expansion, $\times 10^{-6}$ in/in °F. | | K, Thermal Conductivity, BTU/Hr in °F. | | $\frac{KS}{\alpha}$, $\frac{BTU\text{-}lbs.}{Hr\,(in^3)}$ Thermal Shock Factor | | E Young's Modulus $10^6$ psi |
|---|---|---|---|---|---|---|---|---|---|---|---|
| | Room Temp. | 1200° C. | | | Room Temp. | 1200° C. | Room Temp. | 1200° C. | Rm. Temp. | 1200° C. | |
| Sample No. 1 $Si_3N_4 + 8\% Y_2O_3$ | 103.6 | 105.7 | 87.6 | 3.4 | 0.87 | 1.87 | 3.23 | 3.23 | 179 | 182 | 53 |
| Sample No. 2 $Si_3N_4 + 11\text{-}12\% Y_2O_3$ | 115 | 70 | 87.0 | 3.398 | 1.5 | 2.7 | 4.4 | 4.4 | 337 | 114 | 51 |
| Sample No. 3 $Si_3N_4 + 4\% Y_2O_3$ | 101 | 70 | 87.0 | 3.39 | .87 | 1.86 | 3.21 | 3.20 | 176 | 176 | 53 |
| Sample No. 4 | | | | | | | | | | | |
| Sample No. 5 $Si_3N_4 + 15\%$ (88% ZrO + 12% $Y_2O_3$ known as Zytrite) | Substantially equivalent properties to Sample 2. | | | | | | | | | | |
| Sample No. 6 $Si_3N_4 + 15$ (88% ZrO + 12% $Y_2O_3$ + 1.5 Fe impurities known as modified Zytrite) | Substantially equivalent properties to Sample 2. | | | | | | | | | | |
| Sample No. 7 SiC (Prior Art) | | 93 | 91.5 | 3.29 | 1.53 | 2.57 | 4.09 | 1.71 | | | |
| Sample No. 8 $Al_2O_3$ (Prior Art) | 75 | 30 | 9.14 | 4.252 | 4.4 | 5.7 | 1.9 | 3 | 324 | 16 | 67 |
| Sample No. 9 WC (Prior Art Tool) | | | | | | | | | | | |
| Sample No. 10 SiC base tool coated with $Al_2O_3$ (Prior Art) | | | | | | | | | | | |

TABLE II

| Sample No. | Corner Configuration Number | Cutting Condition | | | Mass of Material Removed in³/min | Time (MIN) or (min-sec) | Tool Wear (Inches) | | Thermal and Mechanical Cracks |
|---|---|---|---|---|---|---|---|---|---|
| | | Speed (sfm) | Feed (ipr) | Depth of cut (in.) | | | Flank | Crater | |
| Continuous Cutting | | | | | | | | | |
| 1A | 1 | 4000 | .010 | .100 | 48 | 5.2 | none | none | NIL |
| 1B | 3 | 3000 | .020 | .100 | 72 | 5.7 | none | none | NIL |
| 1C | 1 | 3000 | .010 | .100 | 36 | 17.5 | none | none | NIL |
| 1D | 1 | 2000 | .0111 | .100 | 26.4 | 43.7 | none | none | NIL |
| 1E | 3 | 1000 | .0222 | .100 | 26.4 | 26.8 | none | none | NIL |
| 1F | 2 | 750 | .029 | .100 | 26.4 | 11.7 | none | none | NIL |
| 1G | 1 | 500 | .044 | .100 | 26.4 | 10.5 | none | none | NIL |
| 1H | 2 | 333 | .066 | .100 | 26.4 | 1.9 | none | none | Mechanical Fracture |
| 1I | 3 | 2000 | .011 | .100 | — | 21.0 | .015" | none | NIL |
| Intermittent Cutting | | | | | | | | | |
| 1K | 2 | 1000 | .011 | .100 | 13.2 | 2.3 | none | none | NIL |
| 1L | 5 | 750 | .029 | .100 | 26.4 | 1.1 | none | none | NIL |
| 1M | 6 | 750 | .044 | .100 | 39.6 | 0.6 | none | none | NIL |
| 1N | 7 | 500 | .011 | .100 | 6.6 | 4.1 | none | none | NIL |
| 1O | 4 | 2000 | .011 | .100 | 26.4 | 8.8 | none | none | NIL |
| 1P | 8 | 1000 | .022 | .100 | 26.4 | 7.7 | none | none | NIL |
| Interrupted Cutting | | | | | | | | | |
| 1Q | 6 | 1000 | .0111 | .100 | 13.2 | 3.7 | .0016" | NIL | NIL |
| 1R | 8 | 1000 | .0222 | .100 | 26.4 | 10.0 | .0013 | NIL | NIL |
| 1S | 7 | 2000 | .0111 | .100 | 26.4 | 10.5 | .0021 | NIL | NIL |
| 4A | 2 (Trial 1) | 2000 | .0111 | .100 | 26.4 | 9.82 | .0116 | — | NIL |
| 4B | 3 (Trial 2) | 2000 | .0111 | .100 | 26.4 | 10.00 | .002 | — | NIL |
| 4C | 1 | 1000 | .0222 | .100 | 26.4 | 9.88 | .0019 | — | NIL |
| 5A | (Trial 1) | 2000 | .011 | .100 | 26.4 | 10.00 | .005 | — | NIL |
| 5B | (Trial 2) | 2000 | .011 | .100 | 26.4 | 5.15 | .002 | — | NIL |
| 5C | | 1000 | .022 | .100 | 26.4 | 10.10 | .002 | — | NIL |
| Continuous Cutting | | | | | | | | | |
| 6A | | 2000 | .0111 | .10 | 26.4 | 0.02" | Faction by | | Mechanical |

TABLE II-continued

| Sample No. | Corner Configuration Number | Cutting Condition Speed (sfm) | Feed (ipr) | Depth of cut (in.) | Mass of Material Removed in³/min | Time (MIN) or (min-sec) | Tool Wear (Inches) Flank | Crater | Thermal and Mechanical Cracks |
|---|---|---|---|---|---|---|---|---|---|
| 6B |  | 1000 | .0222 | .10 | 26.4 | 0'15" | Fracture Faction by Fracture | | Fracture Mechanical Fracture |
| 6C |  | 1000 | .0111 | .100 | 13.2 | 0'11" | Faction by Fracture | | Mechanical Fracture |

TABLE III

| Sample | Material | Cutting Operation | Tool Geometry | Speed (sfm) | Feed (ipr) | Depth of Cut (inches) | Work Pieces Produced before Failure |
|---|---|---|---|---|---|---|---|
| 1 | Hot Pressed $Si_3N_4$ + 8% $Y_2O_3$ | Broaching of Engine block Surface | SNG 636 | 150 | — | .02 | 1910 |
| 9 | (Prior Art Tool) WC | Broaching of Engine block Surface | SNG 636 | 150 | — | .02 | 800 |
| 1 | Hot Pressed $Si_3N_4$ + 8% $Y_2O_3$ | Rough facing of Surface A (intermittent cutting) | SNG 434 | 496 | .016 | .125–.250 | 1200 |
| 10 | (Prior Art Tool) SiC base tool coated with $Al_2O_3$ | Rough facing of Surface A (intermittent cutting) | SNG 434 | 496 | .016 | .125–.250 | 150 |
| 1 | Hot Pressed $Si_3N_4$ + 8% $Y_2O_3$ | Semi finish and finish bore surface E (continuous cutting) | TPG 322 | 516 | .012–.006 | .025 | 1000 |
| 9 | (Prior Art Tool) WC | Semi finish and finish bore surface E (continuous cutting) | TPG 322 | 516 | .012–.006 | .025 | 250 |
| 3 | Hot Pressed $Si_3N_4$ + $Y_2O_3$ | Semi-finish and finish bore surface F (spline hole) Interrupted cutting) | TPG 322 | 516 | .0135–.006 | .025 | 320 |
| 1 | Hot Pressed $Si_3N_4$ + 8 $Y_2O_3$ | Rough face of Surface C (interrupted cutting | TNG 434 | 965–496 | .012 | .093 | 420 |
| 10 | (Prior Art Tool) SiC base tool coated with $Al_2O_3$ | Rough face of Surface C (interrupted cutting | TNG 434 | 965–496 | .012 | .093 | 50 |
| 1 | Hot Pressed $Si_3N_4$ + 8 $Y_2O_3$ | Rough turning of outside diameter on surface B (continuous cutting) | TNG 434 | 998 | .014 | .0625 | 420 |
| 10 | (Prior Art Tool) SiC base tool coated with $Al_2O_3$ | Rough turning of outside diameter on surface B (continuous cutting) | TNG 434 | 998 | .014 | .0625 | 50 |
| 1 | Hot Pressed $Si_3N_4$ + 8 $Y_2O_3$ | Rough boring of inside diameter on surface D (continuous cutting) | TNG 434 | 1026 674 | .0189 to 0039 | .0625 | 157 |
| 10 | (Prior Art Tool) SiC base tool coated with $Al_2O_3$ | Rough boring of inside diameter on surface D (continuous cutting) | TNG 434 | 1026 674 | .0189 to 0039 | .0625 | 50 |
| 1 | Hot Pressed $Si_3N_4$ + 8% $Y_2O_3$ | Finish mill end of block (intermittent cutting) |  |  | .0043 (ipt) | .065 | 2100 |
| 11 | $Al_2O_3$ base + 5% TiN | Finish mill end of block (intermittent cutting) | TNG 434 | 1026 674 | .0043 (ipt) | .065 | 400 |

TABLE IV

| Sample No. | Material | Thermal Shock Parameter $\frac{KS}{\alpha}$ Room Temp. | Thermal Shock Parameter $\frac{KS}{\alpha}$ High Temp. (1200° C.) | Parts Produced (Continuous Cutting) End Facing (A) | Parts Produced (Interrupted Cutting) Flange Machine (B) |
|---|---|---|---|---|---|
| 1 | $Si_3N_4$ + 8% $Y_2O_3$ | 179 | 182 | 1200 | 420 |
| 2 | $Si_3N_4$ + 12% $Y_2O_3$ | | 114 | 600 | 210 |
| 8 | $Al_2O_3$ | | 16 | 200 | Fails by thermal cracking at outset |

K = Thermal Conductivity, BTU/Hr in °F.
S = Modulus of Rupture, KSI, (4-point bending).
$\alpha$ = Coefficient of Thermal Expansion, $\times 10^{-6}$ in/in °F.

TABLE V

| Sample No. | Material | Cutting Condition Speed (sfm) | Cutting Condition Feed (ipr) | Cutting Condition Depth of Cut (in) | No. of Work Pieces Produced |
|---|---|---|---|---|---|
| 12 | Hot Pressed $Si_3N_4$ with 8% $Y_2O_3$; $\frac{Y_2O_3}{SiO_2}$ 2.30 | 496 | .016 | .125 to .250" | 1200 |
| 13 | Same; $\frac{Y_2O_3}{SiO_2} = 1.7$ | 496 | .016 | .125 to .250" | 1112 |
| 14 | Same $\frac{Y_2O_3}{SiO_2} = 1.41$ | 496 | .016 | .125 to .250" | 620 |
| 15 | Same; $\frac{Y_2O_3}{SiO_2} = 1.18$ | 496 | .016 | .125 to .250" | 200 |
| 16 | Hot Pressed $Si_3N_4$ with 11% $Y_2O_3$; $\frac{Y_2O_3}{SiO_2} = 1.45$ | 496 | .016 | .125 to .250" | 580 |
| 17 | Hot Pressed $Si_3N_4$ with 4% $Y_2O_3$; $\frac{Y_2O_3}{SiO_2} = 2.7$ | 496 | .016 | .125 to .250" | 360 average wear .016" max. wear .023" flake depth .003–.007" |
| 18 | Hot Pressed per Gazza (prior art) 4.45% $Y_2O_3$; $\frac{Y_2O_3}{SiO_2} = .62$ | 496 | .016 | .125 to .250" | 360 average wear .024" max. wear .030" flake depth .01–.016" |

We claim:

1. A method of making a unitary silicon nitride cutting tool comprising object, comprising:
   (a) placing in a hot pressing environment a controlled mixture consisting essentially of $Si_3N_4$, $Y_2O_3$, $Al_2O_3$, and $SiO_2$, wherein said $Al_2O_3$ is present in an amount of 0.5–2.5% by weight of the mixture and $Y_2O_3$ comprises about 7% to about 9% by weight of said mixture and the $Y_2O_3/SiO_2$ weight ratio therein is at least about 1.6, said controlled mixture being further comprised of a first part, a second part, and a third part said first part consisting essentially of substantially alpha phase $Si_3N_4$ and $SiO_2$ containing less than about 1.0% by weight cation impurities excluding free silicon, said second part consisting essentially of $Y_2O_3$, said third part consisting essentially of $Al_2O_3$;
   (b) hot pressing said controlled mixture at a temperature and pressure and for a time sufficient to compact and react said controlled mixture into a unitary silicon nitride comprising object having a density of at least about 3.25 g/cm³; and
   (c) cooling the resultant unitary object.

2. A method in accordance with claim 1, wherein said $Y_2O_3/SiO_2$ weight ratio is at least about 2.5.

3. A method in accordance with claim 1, wherein said first powder contains about 0.5 to about 1.5% by weight $O_2$.

4. A method in accordance with claim 2, wherein said first powder contains less than 0.5% by weight cation impurities excluding free silicon.

5. A method of making a unitary silicon nitride cutting tool comprising object, comprising:
   (a) placing in a hot pressing environment a controlled powder mixture consisting essentially of $Si_3N_4$, $Y_2O_3$, $SiO_2$ and 0.5–2.5% by weight milling media selected from the group consisting of $Al_2O_3$, WC, TiC and $Si_3N_4$, wherein said $Y_2O_3$ comprises about 4% to about 12% by weight of said controlled powder mixture and the $Y_2O_3/SiO_2$ weight ratio therein is at least about 1.6, said controlled powder mixture being further comprised of a first powder, a second powder, and a third powder said first powder consisting essentially of substantially alpha phase $Si_3N_4$ and $SiO_2$ containing less than about 1.0% by weight cation impurities excluding free silicon and containing up to about 0.7% by weight oxygen combined as $SiO_2$, said second powder consisting essentially of $Y_2O_3$ said third powder consisting essentially of said selecting milling media;
   (b) hot pressing said controlled mixture at a temperature and pressure and for a time sufficient to compact and react said controlled powder mixture into a unitary silicon nitride comprising object having a density of at least about 3.25 g/cm³; and
   (c) cooling the resultant unitary object.

* * * * *